US009665493B2

(12) United States Patent
Ash et al.

(10) Patent No.: US 9,665,493 B2
(45) Date of Patent: May 30, 2017

(54) INCREASED CACHE PERFORMANCE WITH MULTI-LEVEL QUEUES OF COMPLETE TRACKS

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); David B. Whitworth, Austin, TX (US); Boyan Zhao, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 14/505,702

(22) Filed: Oct. 3, 2014

(65) Prior Publication Data

US 2016/0098295 A1 Apr. 7, 2016

(51) Int. Cl.
*G06F 12/00* (2006.01)
*G06F 12/0875* (2016.01)
*G06F 9/52* (2006.01)
*G06F 3/06* (2006.01)

(52) U.S. Cl.
CPC ............ *G06F 12/0875* (2013.01); *G06F 3/06* (2013.01); *G06F 9/52* (2013.01); *G06F 2212/45* (2013.01)

(58) Field of Classification Search
None
See application file for complete search history.

(56) References Cited

U.S. PATENT DOCUMENTS

| 5,715,424 | A  | * | 2/1998  | Jesionowski | G06F 3/0611  |
|           |    |   |         |             | 711/E12.019  |
| 6,230,200 | B1 | * | 5/2001  | Forecast    | G06F 9/50    |
|           |    |   |         |             | 709/219      |
| 6,425,050 | B1 | * | 7/2002  | Beardsley   | G06F 12/0804 |
|           |    |   |         |             | 711/113      |
| 6,578,131 | B1 | * | 6/2003  | Larson      | G06F 17/30949|
|           |    |   |         |             | 707/E17.036  |
| 7,246,187 | B1 | * | 7/2007  | Ezra        | G06F 9/526   |
|           |    |   |         |             | 710/200      |
| 2001/0042222 | A1 | * | 11/2001 | Kedem   | G06F 11/1458 |
|           |    |   |         |             | 714/6.32     |
| 2004/0078623 | A1 | * | 4/2004  | Totolos, Jr. | G06F 11/2015 |
|           |    |   |         |             | 714/6.2      |
| 2009/0083517 | A1 | * | 3/2009  | Riddle   | G06F 9/526   |
|           |    |   |         |             | 712/30       |
| 2010/0257321 | A1 | * | 10/2010 | Gupta    | G06F 12/084  |
|           |    |   |         |             | 711/138      |
| 2012/0059994 | A1 | * | 3/2012  | Montgomery | G06F 3/0617  |
|           |    |   |         |             | 711/119      |

(Continued)

*Primary Examiner* — Adam Lee
(74) *Attorney, Agent, or Firm* — Griffiths & Seaton PLLC (57) ABSTRACT

Exemplary method, system, and computer program product embodiments for increased cache performance using multi-level queues by a processor device. The method includes distributing to each one of a plurality of central processing units (CPUs) workload operations for creating complete tracks from partial tracks, creating sub-queues of the complete tracks for distributing to each one of the CPUs, and creating demote scan tasks based on workload of the CPUs. Additional system and computer program product embodiments are disclosed and provide related advantages.

9 Claims, 5 Drawing Sheets

(56) References Cited

U.S. PATENT DOCUMENTS

| | | | |
|---|---|---|---|
| 2012/0303877 A1* | 11/2012 | Benhase | G06F 12/123 711/103 |
| 2012/0303888 A1* | 11/2012 | Benhase | G06F 12/0866 711/113 |
| 2012/0303895 A1* | 11/2012 | Benhase | G06F 12/0868 711/118 |
| 2012/0303899 A1* | 11/2012 | Ash | G06F 12/0866 711/119 |
| 2012/0324173 A1* | 12/2012 | Benhase | G06F 12/121 711/141 |
| 2013/0024625 A1* | 1/2013 | Benhase | G06F 12/0862 711/136 |
| 2013/0031295 A1* | 1/2013 | Benhase | G06F 12/0888 711/102 |
| 2013/0185489 A1* | 7/2013 | Benhase | G06F 12/123 711/103 |
| 2013/0185504 A1* | 7/2013 | Ash | G06F 12/0866 711/114 |
| 2014/0025898 A1* | 1/2014 | Iyengar | G06F 12/084 711/130 |
| 2014/0082277 A1 | 3/2014 | Ash et al. | |
| 2014/0298058 A1* | 10/2014 | Klingauf | G06F 1/3275 713/322 |
| 2014/0310390 A1* | 10/2014 | Sorenson, III | H04L 47/10 709/223 |
| 2014/0337472 A1* | 11/2014 | Newton | H04L 67/32 709/217 |

* cited by examiner

INCREASED CACHE PERFORMANCE WITH MULTI-LEVEL QUEUES OF COMPLETE TRACKS

BACKGROUND OF THE INVENTION

Field of the Invention

The present invention relates in general computing systems, and more particularly to, systems and methods for increased cache performance efficiency with multi-level queues of complete tracks.

Description of the Related Art

In today's society, computer systems are commonplace. Computer systems may be found in the workplace, at home, or at school. Computer systems may include data storage systems, or disk storage systems, to process and store data. Within the computer system, a "cache" typically refers to a small, fast memory or storage device used to store data or instructions that were accessed recently, are accessed frequently, or are likely to be accessed in the future. Reading from or writing to a cache is typically cheaper (of access time and/or resource utilization) than accessing other memory or storage devices. Once data is stored in cache, it can be accessed in cache instead of re-fetching and/or re-computing the data, say both time and resources.

SUMMARY OF THE INVENTION

In one embodiment, a method is provided for increased cache efficiency with multi-level queues of complete tracks in a computing environment. In one embodiment, by way of example only, the method distributes to each one of a plurality of central processing units (CPUs) workload operations for creating complete tracks from partial tracks, creates sub-queues of the complete tracks for distributing to each one of the CPUs, and creates demote scan tasks based on workload of the CPUs.

In another embodiment, a computer system is provided for increased cache efficiency with multi-level queues of complete tracks in a computing environment. The computer system includes a computer-readable medium and at least one processor in operable communication with the computer-readable medium. The processor distributes to each one of a plurality of central processing units (CPUs) workload operations for creating complete tracks from partial tracks, creates sub-queues of the complete tracks for distributing to each one of the CPUs, and creates demote scan tasks based on workload of the CPUs.

In a further embodiment, a computer program product is provided for increased cache efficiency with multi-level queues of complete tracks in a computing environment. The computer-readable storage medium has computer-readable program code portions stored thereon. The computer-readable program code portions include a first executable portion that distributes to each one of a plurality of central processing units (CPUs) workload operations for creating complete tracks from partial tracks, creates sub-queues of the complete tracks for distributing to each one of the CPUs, and creates demote scan tasks based on workload of the CPUs.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Cache tracks may be allocated to a cache. For example, during an initial microcode load (IML) 17 segments (each 4 kb) may be collected into a complete track CSCB (cache segment control block) and add the complete track CSCB to a complete track queue controlled by a lock. When a central processing unit (CPU) processes a request for a new track in cache for a read/write operation, the CPU obtains a complete track queue lock, removes the first complete track from the queue, and releases the complete track queue lock. At the end of the read/write operation on the CPU, the remaining unused segments are gathered into a partial track CSCB, and returned to the partial track queue (also controlled by a lock) by obtaining a partial track queue lock, adding the partial track to the partial track queue, and releasing the lock.

If the complete track queue becomes low on complete tracks, then another background demote scan task will move the oldest tracks in cache from the ULRU (unmodified least recently used) list to the partial track queue. A background reclaim task obtains the partial track queue lock, removes multiple partial tracks, releases the partial track queue lock, combines the partial tracks into complete tracks, obtains the complete track queue lock, adds the complete tracks to the complete track queue, and releases the complete track queue lock.

In the event that the CPUs increase to 64 CPUs or more, maximum performance is achieved by reducing the lock contention, reducing the duration of time the lock is held, reducing the processor l1/l2 cache misses which require reading main memory, and ensuring the memory reclaim tasks can keep up with memory allocation tasks. With 64 CPUs requesting complete tracks, and just 1 demote scan task and 1 reclaim task re-building complete tracks, a need exists for allocating and reclaiming cache complete tracks in order to reach 1 million input/outputs per second (IOPS).

To address this need, the present invention increases cache performance efficiency with multi-level queues of complete tracks. In one embodiment, the present invention distributes the work of creating complete tracks from partial tracks to each of the CPUs, creates sub-queues of complete tracks that can be distributed amongst the CPUs quickly, and greatly reduces lock contention and L1/L2 cache misses, which results in greatly improved performance. In one embodiment, by way of example only, the present invention distributes to each one of a multiplicity of CPU workload operations for creating complete tracks from partial tracks, creates sub-queues of the complete tracks for distributing to each one of the CPUs, and/or creates demote scan tasks based on workload of the CPUs.

In one embodiment, both a complete track queue without a lock and partial track pointer without a lock are created by each one of the CPUs. Append queues and build queues are created as sub-queues of the complete tracks in front of the complete track queues. An overall partial track queue is removed. Queues of the complete tracks using pointer copy are obtained and allocated for reducing lock contention and cache misses.

Figure 1:
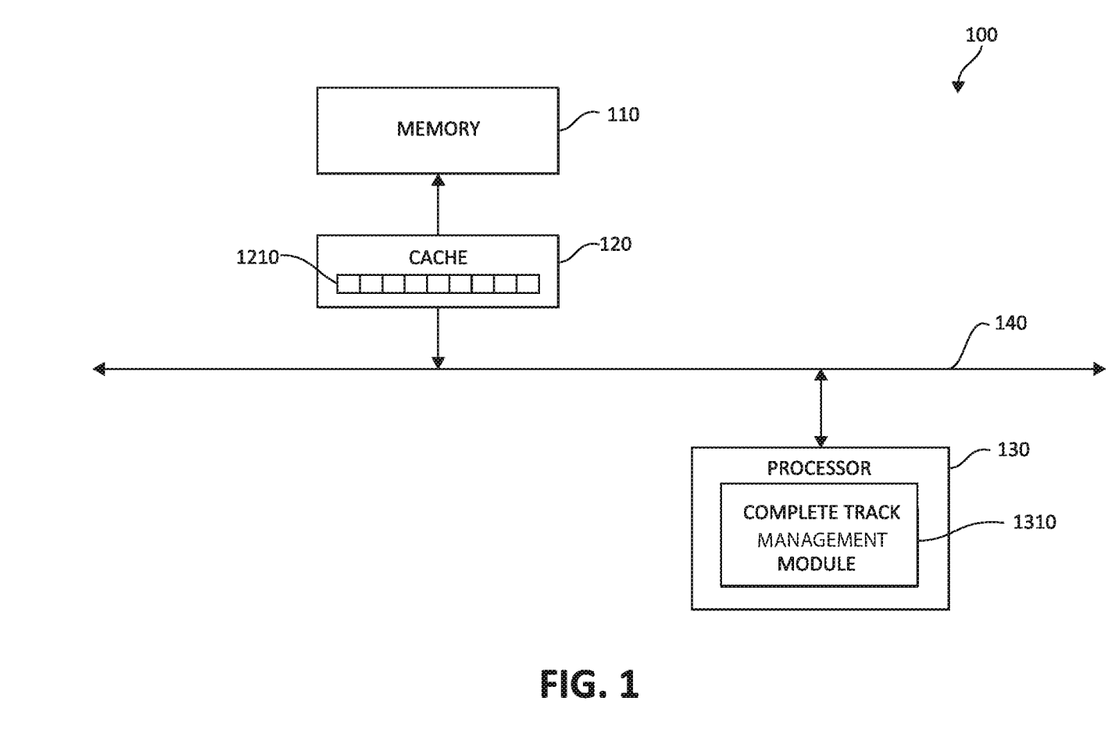
FIG. 1 illustrates is an exemplary block diagram showing a hardware structure for increased cache efficiency with multi-level queues of complete tracks in which aspects of the present invention may be realized.

Turning to FIG. 1, a block diagram of one embodiment of a system 100 for increasing cache performance efficiency with multi-level queues of complete tracks is depicted. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict. For creating multi-level queues of complete tracks, a processor 130 is configured to execute a method for creating multi-level queues of complete tracks.

In various embodiments, processor 130 comprises or has access to a complete track management module 1310, which comprises computer-readable code that, when executed by processor 130, causes processor 130 to perform the method for creating multi-level queues of complete tracks.

In various other embodiments, processor 130 is configured to distribute the work of creating complete tracks from partial tracks to all CPUs, creates sub-queues of complete tracks that can be distributed amongst the CPUs quickly, and greatly reduces lock contention and L1/L2 cache misses, which results in greatly improved performance.

In various other embodiments, processor 130 is configured to create the complete track queue and partial track pointer without a lock by each one of the CPUs. Append queues and build queues are created as sub-queues of the complete tracks in front of the complete track queues. An overall partial track queue is removed. Queues of the complete tracks using pointer copy are obtained and allocated for reducing lock contention and cache misses.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Figure 2:
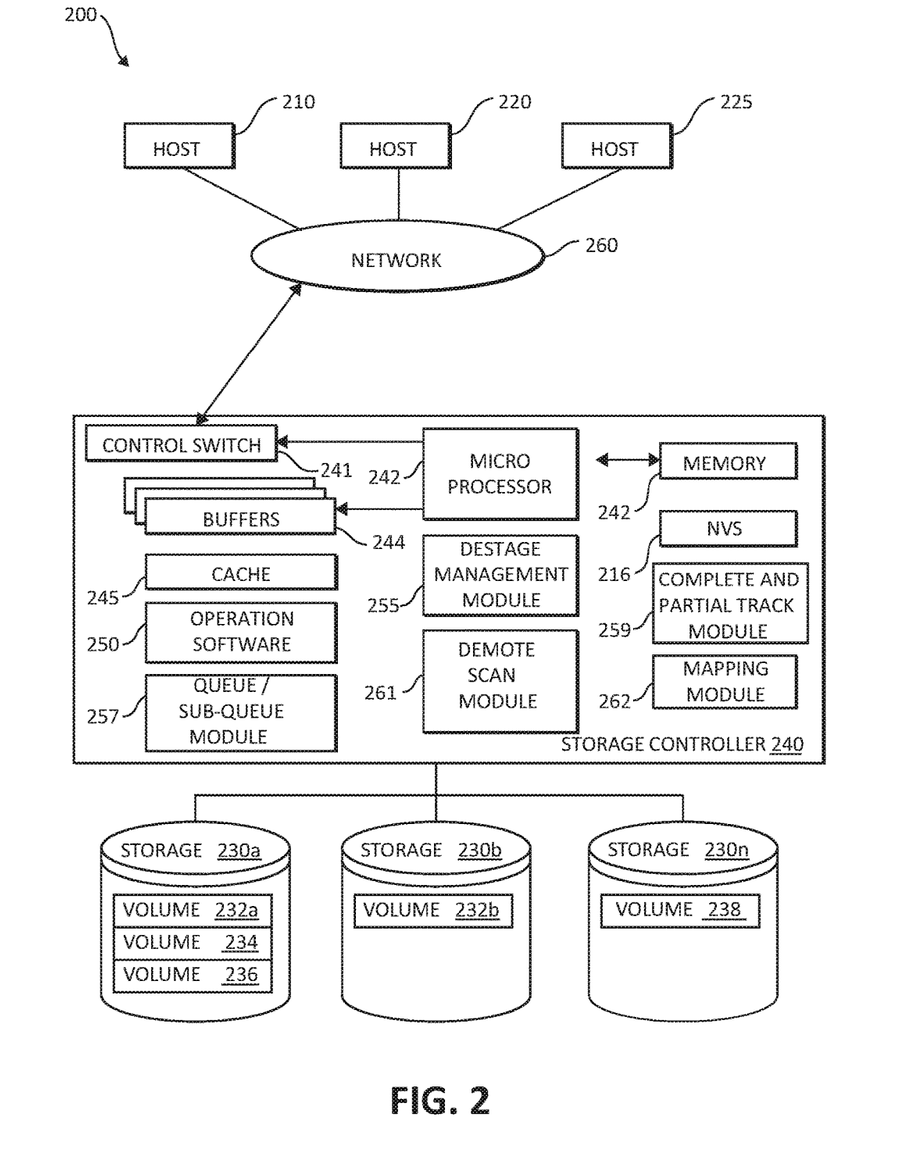
FIG. 2 is an exemplary block diagram showing a hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical 3 s, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232b is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a destage management module 255, a queue and a sub-queue module 257, a complete and partial task module 259, and a demote scan module 261. The destage management module 255, the queue and a sub-queue module 257, the complete and partial task module 259, and the demote scan module 261 may be one complete module functioning simultaneously or separate modules. The destage management module 255, the queue and a sub-queue module 257, the complete and partial task module 259, and the demote scan module 261 may have some internal memory (not shown) in which the destaging algorithm may store unprocessed, processed, or "semi-processed" data. The destage management module 255, the queue and a sub-queue module 257, the complete and partial task module 259, and the demote scan module 261 may work in conjunction with each and every component of the storage controller 240, the hosts 210, 220, 225, and other storage controllers 240 and hosts 210, 220, and 225 that may be remotely connected via the storage fabric 260. Both the destage management module 255, the queue and a sub-queue module 257, the complete and partial task module 259, and the demote scan module 261 may be structurally one complete module or may be associated and/or included with other individual modules. The destage management module 255, the queue and a sub-queue module 257, the complete and partial task module 259, and the demote scan module 261 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the destage management module 255, the complete and partial task module 259, and the demote scan module 261 in which information may be set. Multiple buffers 244 may be implemented to assist with the methods and steps as described herein.

In one embodiment, the cluster hosts/nodes, 210, 220, 225 and the storage controller 240 are connected through a network adaptor (this could be a fibre channel) 260 as an interface i.e., via a switch called "fabric." In one embodiment, the operation of the system shown in FIG. 2 may be described as follows. The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, destage management module 255, the complete and partial task module 259, and the demote scan module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As described herein, the present invention provides multi-level queues of complete tracks to improve cache performance. The present invention distributes the work of creating complete tracks from partial tracks to all the CPUs and creates sub-queues of complete tracks that can be distributed among the CPUs. Each CPU performs the partial track to complete track work at the end of access. The CPUs get (obtain) and give (allocated) queues of complete tracks with a pointer copy so that lock contention and L1/L2 misses are reduced.

Figure 3:
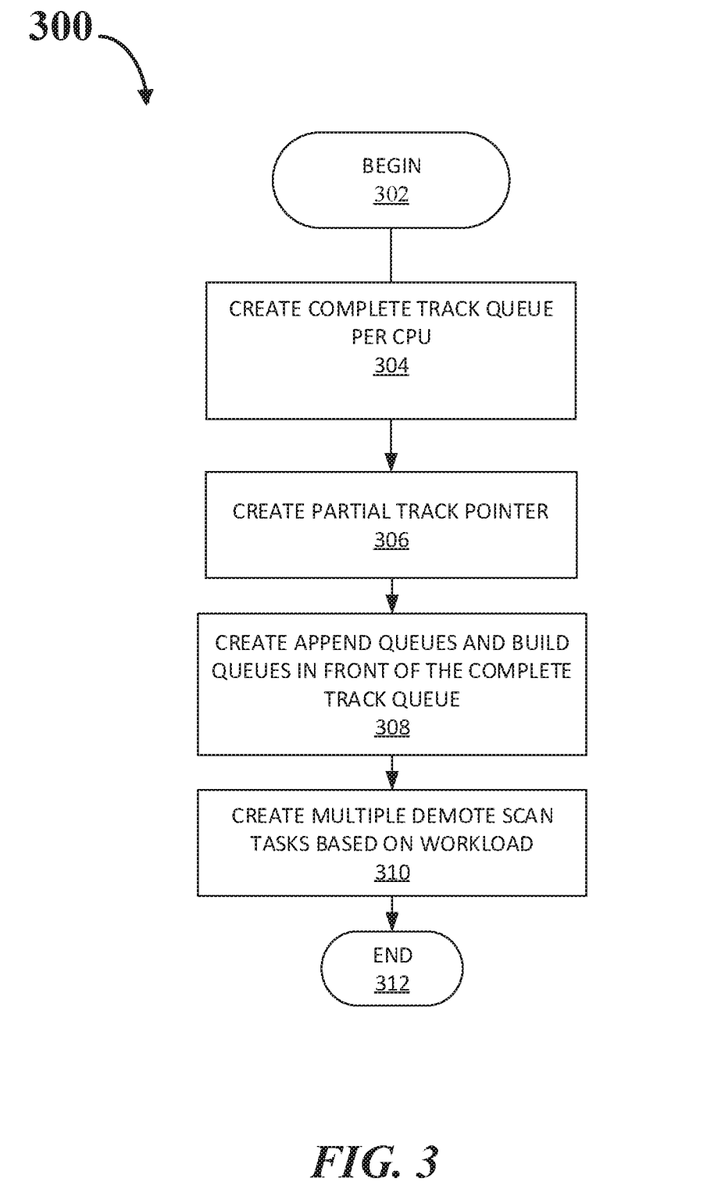
FIG. 3 illustrates an exemplary method for increased cache efficiency by creating multi-level queues of complete tracks in which aspects of the present invention may be realized.

Turning to FIG. 3, a flowchart illustrates an exemplary method 300 for providing multi-level queues of complete tracks to improve cache performance is depicted. The method 300 begins (step 302). A complete track queue is created per CPU with no lock (step 304). A partial track pointer is created per CPU with no lock (step 306). The method 300 will create append queues and build queues, which are sub-queues of the complete tracks, in front of the complete track queue (step 308). The method 300 creates multiple demote scan tasks based on workload (step 310). The method 300 ends (step 312).

Figure 4:
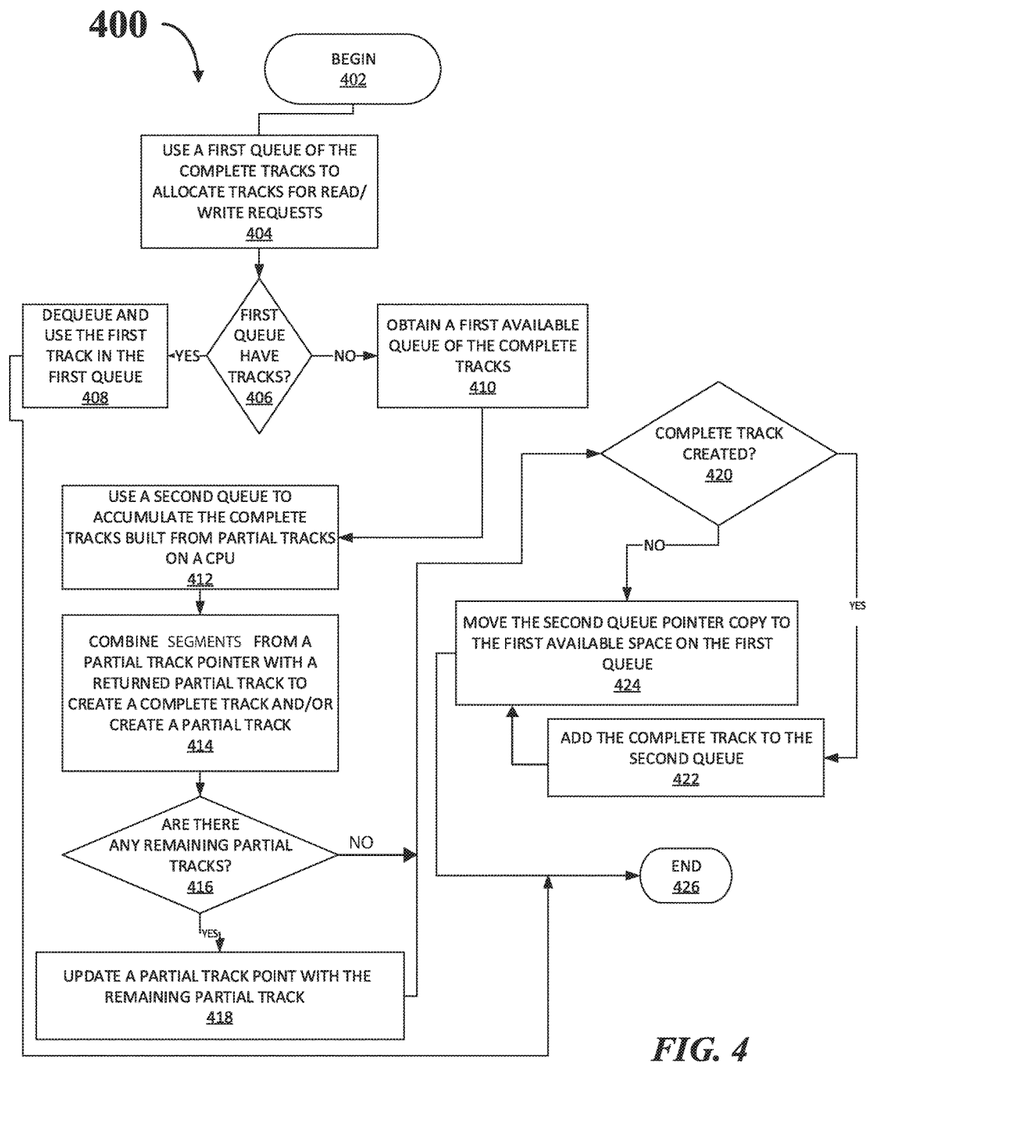
FIG. 4 is a flowchart illustrating an exemplary method 400 creating complete tracks from partial tracks and creating sub-queues of the complete tracks in which aspects of the present invention may be realized.

FIG. 4 is a flowchart illustrating an exemplary method 400 creating complete tracks from partial tracks and creating sub-queues of the complete tracks. The method 400 begins (step 402). The method 400 uses a first queue, which may be referred to as "CompleteTrackQueue0" of the complete tracks to allocate tracks for read or write request (step 404). The method 400 determines if this first queue has tracks (step 406). If yes, the first track in this first queue is dequeued and used (step 408). If no, the method 400 obtains a first available queue of the complete tracks (step 410). Obtaining the first available queue of the complete tracks is performed by each of the following. First, a pointer copy is used to obtain a second queue, which may be referred to as "CompleteTrackQueue1" to complete the first queue or "CompleteTrackQueue0." Second, a pointer copy with locks is used to obtain an append queue to complete the first queue or "CompleteTrackQueue0." Third, a pointer copy with locks is used to obtain a build queue to complete the first queue or "CompleteTrackQueue0." The complete track queue lock and L1/L2 misses are used to obtain the complete tracks from the complete track queue.

Next, the method 400 uses a second queue, which may be referred to as "CompleteTrackQueue1" to accumulate the complete tracks built from the partial tracks on a particular CPU (step 412). The method 400 combines segments from a partial track pointer with a newly, returned partial track to create a complete track and/or create a partial track (step 414). The method 400 determines if there are any partial tracks remaining (step 416). If no, the method 400 moves to step 420. If yes, the method 400 updates a partial track pointer with the remaining partial track (step 418). If no, the method 400 moves to step 420. The method 400 determines if a complete track is created (step 420). If yes, the method 400 adds the complete track to the second queue ("CompleteTrackQueue1") (step 422). If no from step 420, and also from step 422, the method 400 moves the second queue ("CompleteTrackQueue1") pointer copy to a first available place (step 424). This is performed by moving to the first queue ("CompleteTrackQueue0") if the second queue ("CompleteTrackQueue1") has reached the limit of tracks. A pointer copy with locks is used to move to an append queue if one is available. Third, a pointer copy with locks is used to obtain a build queue if one is available. The lock and L1/L2 misses are used to add to the complete track queue. The method 400 ends (step 426).

A more detailed description is provided now of both append queues and build queues as described herein. Append queues may be 2 times (2x) the number of CPUs and are used to allow the CPUs to quickly obtain queues of the complete tracks by using pointer copy. For example, CPUs may rapidly obtain append queue to CompleteTrackQueue0 or allocate CompleteTrackQueue1 to append queue. The append queues are filled by at least two operations: 1) the CPU provides its CompleteTrackQueue1 to the append queue or 2) build queues are moved to the append queues.

Build queues may be 1 times (1x) the number of CPUs and are used to by a reclaim task (e.g., 1 reclaim task) to create queues of complete tracks from the complete track queue. The build queues may then be moved to append queues with just pointer copy. The build queues are filled by at least two methods: 1) the CPU provides its CompleteTrackQueue1 when all of the append queues are full or 2) the reclaim task fills the build queues.

Figure 5:
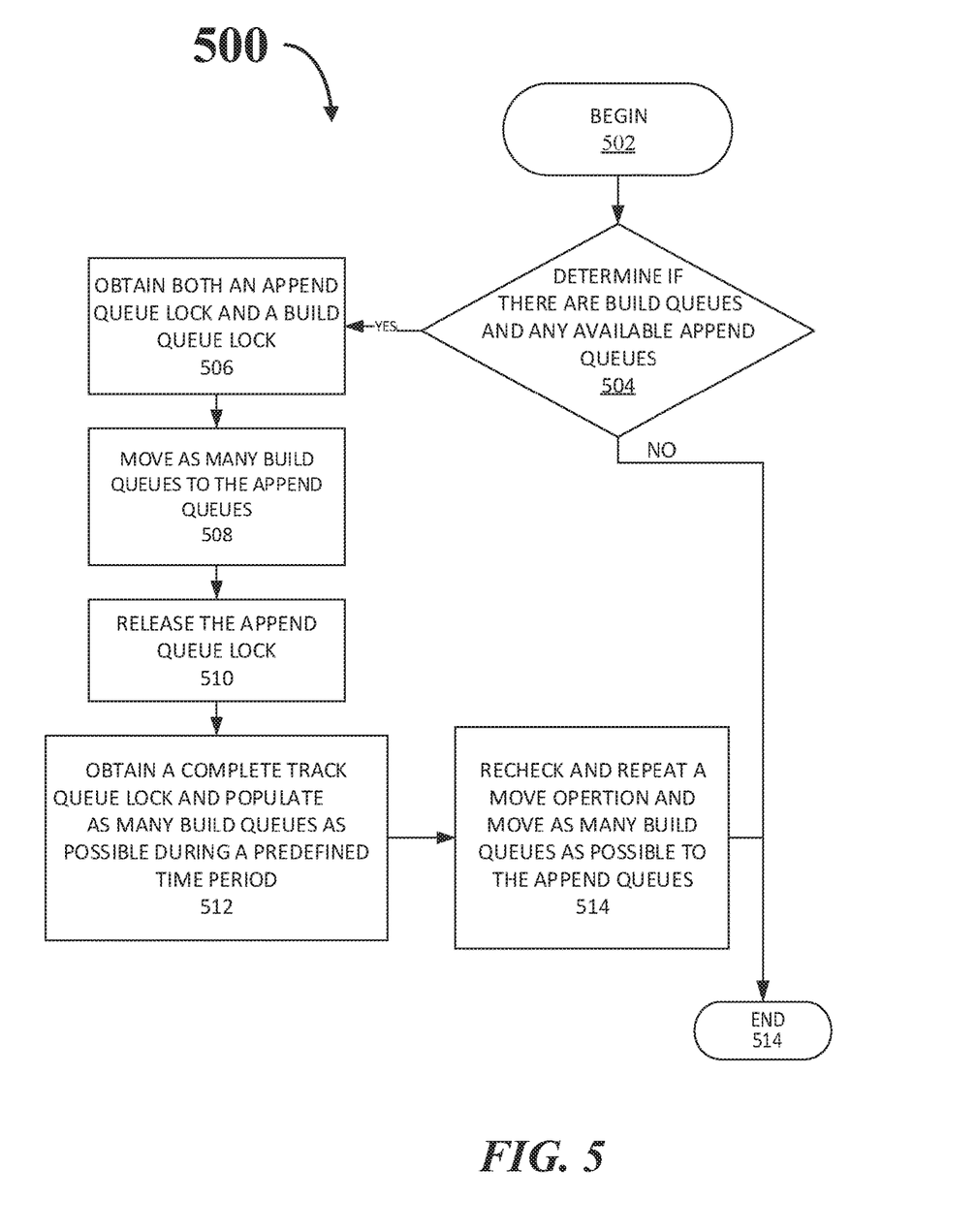
FIG. 5 is a flowchart illustrating an exemplary method using reclaim tasks in which aspects of the present invention may be realized.

FIG. 5 is a flowchart illustrating an exemplary method 500 using a reclaim task. The reclaim task is both a CPU intensive process and L1/L2 cache miss expensive process. The method 500 begins (step 502) by the reclaim task first determining if there are build queues previously created and if there are any available append queues (step 504). If no, the method 500 ends. If yes, the reclaim task obtains both an append queue lock and a build queue lock (step 506). The method 500 then moves as many build queues to the append queues (step 508). In other words, the append queues are filled with the build queues. The reclaim task then releases the append queue lock (step 510). Next, the method 500 obtains a complete track queue lock and populates as many build queues as possible during a predefined time period (step 512). Step 512 operation may also depend on whether any build queues are available. At the end of the time period, the method 500 rechecks and repeat a move operation by moving as many build queues as possible to the append queues (step 514). The method 500 ends (step 516).

As mentioned earlier, the present invention will create multiple demote scan tasks based on workload. Demote scan tasks are essential for maintaining and keeping up with multiple threads from CPUs. For example, as mentioned above, the present invention is used with 64 CPUs operating simultaneously. As such, multiple demote scan tasks are needed to be created to continuously maintain 64 threads coming from 64 requesting complete tracks of the CPUS. The demote scan task will either 1) add more demote scan task control blocks (TCBs) to throttle up and/or 2) remove demote scan TCBs to throttle down in order to keep the complete track queues, append queues, and build queues at the appropriate levels.

Thus, as described herein, the present invention allows for each CPU performing the partial track to complete track work at end access and on behalf of the demote scan. The CPUs will be able to obtain and/or allocate queues of complete tracks with just pointer copy for reducing lock contention and L1/L2 cache misses. The demote scan task operations allow for self throttling by adding or removing TCBs as required in order to keep up with allocation requests. Thus, complete cache tracks may be allocated and reclaimed in order to reach at least one million IOPs per second.

Thus, as described herein, the present invention improves cache efficiency with multi-level queues of complete tracks in a computing environment. In one embodiment, by way of example only, the present invention distributes to each one of a plurality of central processing units (CPUs) workload operations for creating complete tracks from partial tracks, creates sub-queues of the complete tracks for distributing to each one of the CPUs, and creates demote scan tasks based on workload of the CPUs.

In one embodiment, the present invention creates a complete track queue and partial track pointer without a lock by each one of the CPUs, and creates both append queues and build queues as the sub-queues of the complete tracks in front of the complete track queues.

In one embodiment, the present invention obtains and allocates queues of the complete tracks using pointer copy for reducing lock contention and cache misses, uses a first queue of the complete tracks to allocate tracks for read or write request, and uses a second queue to accumulate the complete tracks built from the partial tracks.

In one embodiment, the present invention uses segments from a partial track pointer combined with a partial track to create a complete track, uses the append queues for allowing the CPUs to obtain or allocate queues of the complete tracks, and uses the build queues by a reclaim task to create queues of the complete tracks from a complete track queue.

In one embodiment, the present invention fills the append queues by a central processing unit by providing the second queue of the complete tracks and by moving the build queues to the append queues, and fills the build queues by a central processing unit by providing the second queue of the complete tracks when the append queues are full and by filling the build queues by a reclaim task.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for increased cache performance efficiency by a processor device in a computing environment, the method comprising:

distributing to each one of a plurality of central processing units (CPUs) workload operations for creating complete cache tracks from partial cache tracks by creating a complete cache track queue and a partial cache track pointer without a lock by each one of the CPUs;

using, by each one of the CPUs, an assembler queue to accumulate each of the complete cache tracks from the partial cache tracks including using a pointer copy of a partial cache track to assemble a complete cache track, the assembler queue sending each of the complete cache tracks to the complete cache track queue;

creating sub-queues in front of each of the assembler queues accumulating the complete cache tracks, the sub-queues including both an append queue and a build queue, wherein the build queue fills the append queue using segments from the partial cache track pointer copy combined with a partial cache track and the append queue fills the assembler queue; and creating and throttling a plurality of demote scan tasks to continuously maintain pace with the filling of the complete cache track queue, the assembler queue, and the sub-queues.

2. The method of claim 1, further including using a reclaim task to fill the build queue.

3. The method of claim 1, further including maintaining the plurality of demote scan tasks by adding or removing task control blocks (TCB) according to a number of allocation requests.

4. A system for increased creased cache performance efficiency in a computing environment, the system comprising:

at least one processor device operable in the computing storage environment, wherein the at least one processor device:

distributes to each one of a plurality of central processing units (CPUs) workload operations for creating complete cache tracks from partial cache tracks by creating a complete cache track queue and a partial cache track pointer without a lock by each one of the CPUs, uses, by each one of the CPUs, an assembler queue to accumulate each of the complete cache tracks from the partial cache tracks including using a pointer copy of a partial cache track to assemble a complete cache track, the assembler queue sending each of the complete cache tracks to the complete cache track queue, creates sub-queues in front of each of the assembler queues accumulating the complete cache tracks, the sub-queues including both an append queue and a build queue, wherein the build queue fills the append queue using segments from the partial cache track pointer copy combined with a partial cache track and the append queue fills the assembler queue, and creates and throttles a plurality of demote scan tasks to continuously maintain pace with the filling of the complete cache track queue, the assembler queue, and the sub-queues.

5. The system of claim 4, wherein the at least one processor device uses a reclaim task to fill the build queue.

6. The system of claim 4, wherein the at least one processor device maintains the plurality of demote scan tasks by adding or removing task control blocks (TCB) according to a number of allocation requests.

7. A computer program product for increased cache performance efficiency in a computing environment by a processor device, the computer program product comprising a non-transitory computer-readable storage medium having computer-readable program code portions stored therein, the computer-readable program code portions comprising:

a first executable portion that distributes to each one of a plurality of central processing units (CPUs) workload operations for creating complete cache tracks from partial cache tracks by creating a complete cache track queue and a partial cache track pointer without a lock by each one of the CPUs;

a second executable portion that uses, by each one of the CPUs, an assembler queue to accumulate each of the complete cache tracks from the partial cache tracks including using a pointer copy of a partial cache track to assemble a complete cache track, the assembler queue sending each of the complete cache tracks to the complete cache track queue;

a third executable portion that creates sub-queues in front of each of the assembler queues accumulating the complete cache tracks, the sub-queues including both an append queue and a build queue, wherein the build queue fills the append queue using segments from the partial cache track pointer copy combined with a partial cache track and the append queue fills the assembler queue; and a fourth executable portion that creates and throttles a plurality of demote scan tasks to continuously maintain pace with the filling of the complete cache track queue, the assembler queue, and the sub-queues.

8. The computer program product of claim 7, further including a sixth executable portion that uses a reclaim task to fill the build queue.

9. The computer program product of claim 7, further including a fifth executable portion that maintains the plurality of demote scan tasks by adding or removing task control blocks (TCB) according to a number of allocation requests.

* * * * *